United States Patent
Daniels et al.

(10) Patent No.: US 11,182,357 B2
(45) Date of Patent: Nov. 23, 2021

(54) AUTO TOP OFF TOOL

(71) Applicant: Walmart Apollo, LLC, Bentonville, AR (US)

(72) Inventors: Chris Daniels, Rogers, AR (US); Steve Hager, Bentonville, AR (US); Michael Stuker, Bentonville, AR (US); Joe Don McClure, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 193 days.

(21) Appl. No.: 16/333,661

(22) PCT Filed: Sep. 14, 2017

(86) PCT No.: PCT/US2017/051547
§ 371 (c)(1),
(2) Date: Mar. 15, 2019

(87) PCT Pub. No.: WO2018/053117
PCT Pub. Date: Mar. 22, 2018

(65) Prior Publication Data
US 2019/0258614 A1 Aug. 22, 2019

Related U.S. Application Data

(60) Provisional application No. 62/395,502, filed on Sep. 16, 2016.

(51) Int. Cl.
*G06F 16/21* (2019.01)
*G06F 11/14* (2006.01)

(52) U.S. Cl.
CPC ........ *G06F 16/214* (2019.01); *G06F 11/1451* (2013.01); *G06F 2201/80* (2013.01); *G06F 2201/84* (2013.01)

(58) Field of Classification Search
CPC ... G06F 16/125; G06F 11/1456; G06F 16/214
See application file for complete search history.

(56) References Cited

U.S. PATENT DOCUMENTS

| | | |
|---|---|---|
| 5,878,408 A | 3/1999 | Van Huben et al. |
| 6,151,608 A | 11/2000 | Abrams |

(Continued)

OTHER PUBLICATIONS

International Search Report and Written Opinion for corresponding PCT Application No. PCT/US2017/051547, dated Dec. 5, 2017, 7 pages.

(Continued)

*Primary Examiner* — Albert M Phillips, III
*Assistant Examiner* — Courtney Harmon
(74) *Attorney, Agent, or Firm* — Patterson Thuente Pedersen, P.A.

(57) ABSTRACT

Systems and methods for the migration of large amounts of time-varying data from a source database to a target database are disclosed. After completion of an initial long-duration migration, a validation is performed to determine if any groups of data were updated in the source database during the initial migration. Updated data is then topped-off by migration to a temporary container before merging into the target database. Subsequent validation can confirm that migration is complete or initiate one or more additional top-off migrations.

14 Claims, 10 Drawing Sheets

After Initial Merge

(56) References Cited

U.S. PATENT DOCUMENTS

| | | | |
|---|---|---|---|
| 6,256,635 B1 | 7/2001 | Arrouye et al. | |
| 7,580,970 B2 | 8/2009 | Bank et al. | |
| 7,797,404 B1 | 9/2010 | Knight | |
| 8,214,353 B2 | 7/2012 | Inturi et al. | |
| 8,285,684 B2 | 10/2012 | Prahlad et al. | |
| 8,881,139 B1 | 11/2014 | Acacio | |
| 8,977,594 B2 | 3/2015 | Whitehead et al. | |
| 9,201,883 B1 | 12/2015 | Stickle | |
| 9,600,545 B2 | 3/2017 | Pryce et al. | |
| 2004/0122865 A1 | 6/2004 | Stahl et al. | |
| 2005/0091240 A1 | 4/2005 | Berkowitz et al. | |
| 2007/0112834 A1 | 5/2007 | Farr et al. | |
| 2009/0018996 A1* | 1/2009 | Hunt | G06F 16/2264 |
| 2010/0186014 A1* | 7/2010 | Vaghani | G06F 3/064 718/101 |
| 2012/0124168 A1 | 5/2012 | Boerger et al. | |
| 2014/0121861 A1 | 5/2014 | Mood et al. | |
| 2014/0181040 A1 | 6/2014 | Montulli et al. | |
| 2015/0019488 A1 | 1/2015 | Higginson et al. | |
| 2015/0143064 A1* | 5/2015 | Bhargava | G06F 11/1451 711/162 |
| 2015/0212896 A1 | 7/2015 | Pawar et al. | |
| 2015/0271014 A1 | 9/2015 | Madama | |
| 2015/0304417 A1 | 10/2015 | Tan | |
| 2016/0188377 A1 | 6/2016 | Thimmappa et al. | |
| 2017/0169059 A1 | 6/2017 | Horowitz et al. | |
| 2017/0171021 A1 | 6/2017 | Angaluri et al. | |
| 2018/0006913 A1* | 1/2018 | Asenjo | H04L 41/0631 |
| 2018/0032593 A1 | 2/2018 | Ledbetter et al. | |
| 2018/0096043 A1 | 4/2018 | Ledbetter et al. | |

OTHER PUBLICATIONS

U.S. Appl. No. 15/659,833, filed Jul. 26, 2017, Inventors(s): Ledbetter et al.

Mexican Office Action, Mexican Application No. MX/a/2019/001175, dated Jul. 22, 2019, 4 pages.

\* cited by examiner

AUTO TOP OFF TOOL

RELATED APPLICATIONS

The present application is a National Phase entry of PCT Application No. PCT/US2017/051547, filed Sep. 14, 2017, which claims priority from U.S. Provisional Application No. 62/395,502, filed Sep. 16, 2016, each of which is hereby fully incorporated herein by reference.

TECHNICAL FIELD

The present disclosure is related to the field of database administration, in particular to the migration of data between databases.

BACKGROUND

Many database systems must support the analysis of large data sets in order to meet business, research, or other needs. These large data sets are often colloquially known as "big data." Many database systems, tools, and techniques have been developed to better handle big data.

As used through this disclosure, a database is a structured set of data held in a computer. Database software provides functionalities that allow building, modifying, accessing, and updating both databases and the underlying data. Databases and database software reside on database servers. Database servers are collections of hardware and software that provide storage and access to the database and enable execution of the database software.

A common task for database administrators is the movement, or migration, of data from one database to another. Large (multi-terabyte) tables are common in big data environments, which can pose a particular challenge for data migration, especially when outages resulting in lack of access to either the source or the target database are unacceptable. These challenges are exacerbated when large data sets must be migrated from one database system to another, especially in multi-tenant data warehouse systems.

Data migration tools facilitate the migration of data between databases. These tools are slow, however, and many operate under the assumption that the data in the source database is static during the migration period. Therefore, some existing migration techniques require shutdown of the source database or database system during the migration period. This, however, can result in an unacceptable level of downtime. In addition, the size of the data sets increases the likelihood that data migration will fail, which may result in a need to restart the migration, further extending downtime.

A need exists, therefore, for data migration systems and methods that can move large data sets from a source database to a target database while minimizing down time.

SUMMARY

Embodiments of the present disclosure include systems and methods for the migration of large amounts of time-varying data from a source database to a target database. After completion of an initial long-duration migration, a validation is performed to determine if any groups of data were updated in the source database during the initial migration. Updated data is then topped-off by migration to a temporary container before merging into the target database. Subsequent validation can confirm that migration is complete or initiate one or more additional top-off migrations.

In embodiments systems and methods for migration of time-varying data from a source database to a target database include receiving one or more data definition inputs that define the set of time-varying data to be migrated, and performing an initial migration by determining an initial snapshot of the defined set of time-varying data in the source database from the one or more data definition inputs and the source database, generating one or more data definition outputs from the one or more data definition inputs and the initial snapshot, initiating the copying of the initial snapshot to the target database. After the completion of the initial migration, embodiments of the present disclosure can perform one or more top-off migrations by identifying one or more subsequent sets of time-varying data in the source database that have been updated in the source database between the initial time and the subsequent time from the data definition outputs and the time-varying data in the source database, determining one or more subsequent snapshots from the one or more subsequent sets of time-varying data in the source database; and initiating the copying of the one or more subsequent snapshots to the target database.

In embodiments, systems and methods of the present disclosure can determining a validation result based on whether a portion of the data in the target database is equivalent to the corresponding portion of the time-varying data in the source database and provide an output of the result. In embodiments, systems and methods of the present disclosure can initiate the copying of the initial snapshot by instructing a data mover to perform an operation to copy the initial snapshot to the target database and can receive a notification that the operation is complete from the data mover. In embodiments, validation occurs after the receipt of a notification from the data mover that the operation is complete.

In embodiments, systems and methods of the present disclosure can copy data items from the source database to the target database by creating one or more temporary containers in the target database based on the one or more data definition outputs, copying data items from the source database into the one or more temporary containers, and merging the data items in the one or more temporary containers with the existing data in the target database.

In embodiments, validation is performed by performing operations across groups of data items in the source database and target database, and the validation result includes a definition of groups having differing results. In embodiments, validation is performed on preexisting data in a source database and target database in order to generate the initial data definition.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Figure 1:
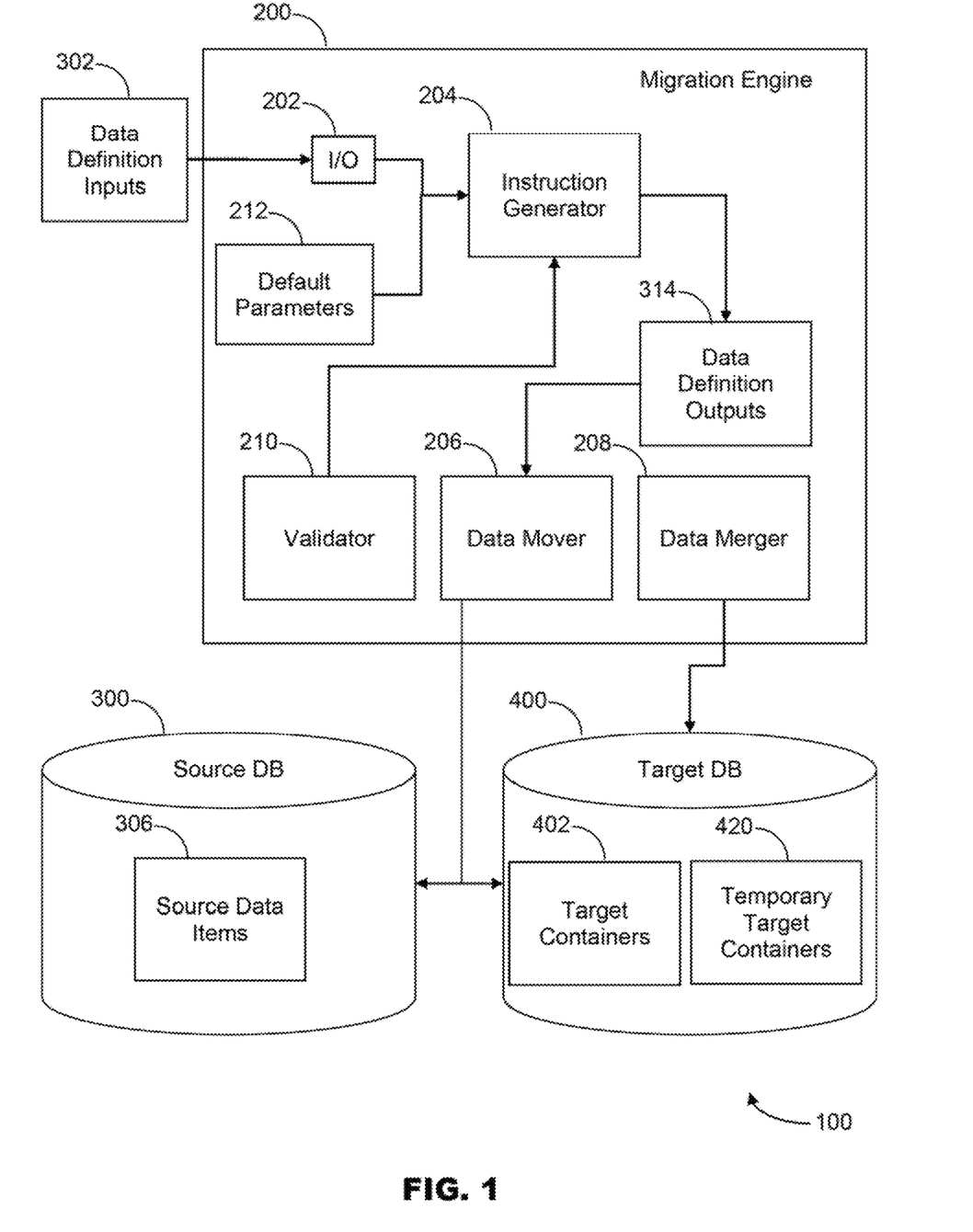
FIG. 1 is a block diagram depicting components of a data migration system, according to an embodiment.

FIG. 1 is a block diagram depicting components of a data migration system 100 according to embodiments. Data migration system 100 generally includes migration engine 200, which is operably connected to source database 300 and target database 400.

As will be described, system 100 and/or its components or subsystems can include computing devices, microprocessors, modules and other computer or computing devices, which can be any programmable device that accepts digital data as input, is configured to process the input according to instructions or algorithms, and provides results as outputs. In an embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In embodiments, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field-10 programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

As an example, migration engine 200, source database 300, and target database 400 may be present on a single computing device in an embodiment. In other embodiments, source database 300 and target database 400 may be present on one or more database systems physically separate from migration engine 200. In other embodiments, components of migration engine 200 may be present on multiple separate computing devices.

In embodiments, each of source database 300 and target database 400 may be relational databases with tabular structure, or NoSQL or other non-relational databases with key-value, grid, or other structures. Source database 300 and target database 400 provide storage for one or more data items. In embodiments, data items can include individual cells or fields, rows, tables, key-value pairs, or entire databases. In embodiments, the stored data items can be divided into groups based on criteria such as the values of subcomponents of each data item. Each stored data item can be held in one or more containers within source database 300 and target database 400.

In an example embodiment, the containers of source database 300 may be one or more tables, each table having a set of defined columns, and each data item can comprise a single row a table which can include cells which contain values corresponding to the defined columns. In such an embodiment, the data items could then be grouped based on the value of the cells in a given column.

In embodiments, migration engine 200 includes user interface 202, instruction generator 204, data mover 206, data merger 208, and validator 210. Components of migration engine 200 are configured to create a copy of a set of time-varying source data items 306 in one or more target containers 402 of target database 400. As depicted in FIG. 1, various components of migration engine 200 are operably connected, though more or fewer connections may be present. Similarly, some or all of the functionality of each component of migration engine 200 may be shared between one or more additional components.

User interface 202 receives data definition inputs 302 from a user or process including parameters regarding the data to be migrated. Data definition inputs 302 can be structured query language (SQL) files, configuration files, command-line inputs, inputs through application programming interface (API) calls, graphical user interface inputs, combinations of these, and/or other inputs as required. Data definition inputs 302 are depicted in more detail in FIG. 2. Data definition inputs 302 can include parameters regarding the location and connection details 303 for source database 300 and target database 400, the location and structure of target container 402 within target database 400, data definitions 304 defining the source data items 306 to be migrated, mapping details 308 defining how source data items 306 should be stored within target container 402, validation parameter 310 defining a portion of source data items 306 to be used for validation purposes, and grouping criteria 312 defining a logical grouping of source data items 306 for validation purposes. In embodiments, migration engine 200 may be provided with default parameters 212 for one or more of the data definition inputs 302, which could then be optionally overwritten by inputs provided to user interface 202.

Figure 2:
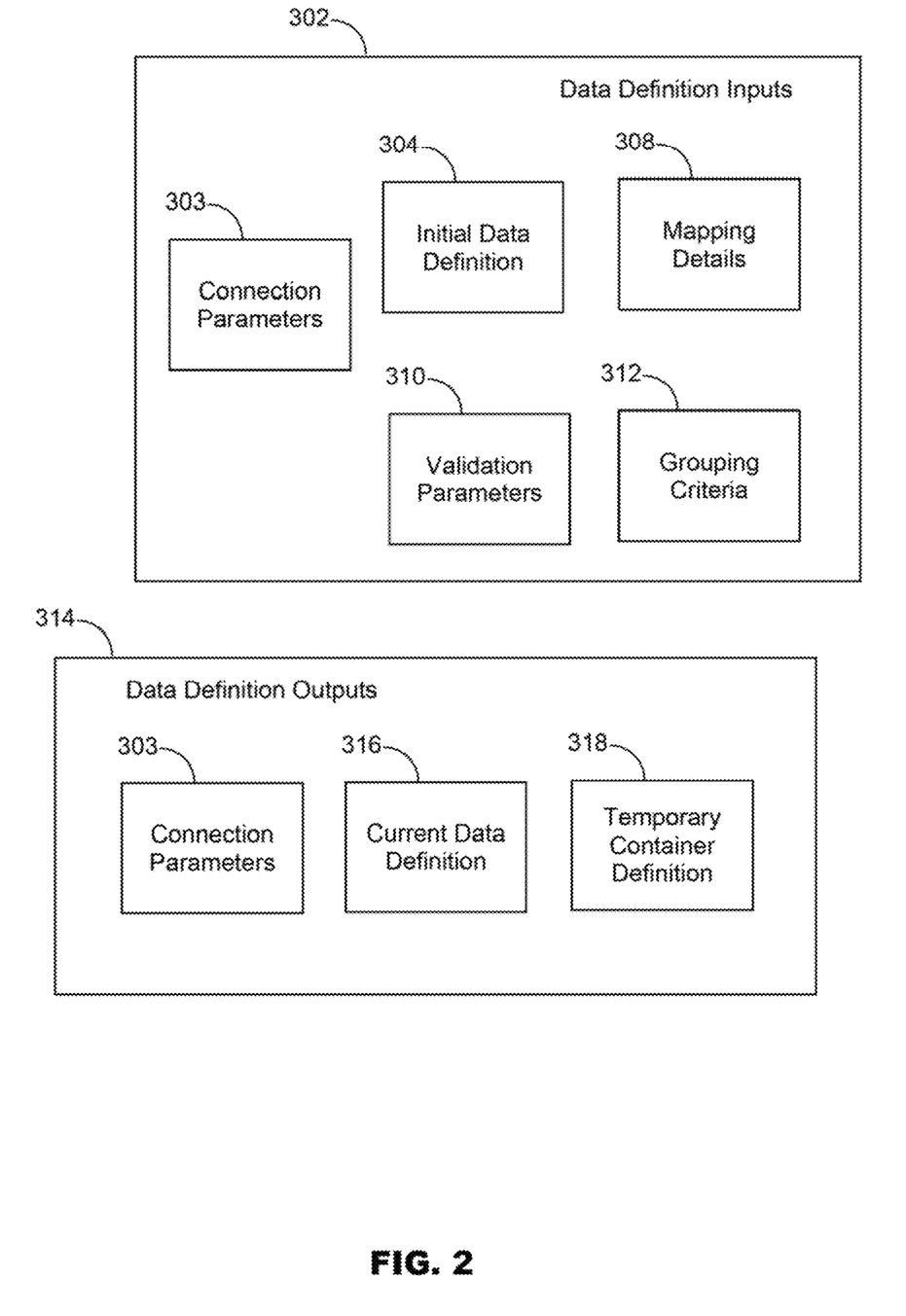
FIG. 2 is block diagram depicting components of data structures used by a data migration system, according to an embodiment.

Instruction generator 204 generates data definition outputs 314, which provide the necessary configuration parameters for data mover 206. Data definition outputs 314 are depicted in more detail in FIG. 2. Data definition outputs 314 can be SQL files, configuration files, command-line inputs, API calls, combinations of these, and/or other inputs as required by data mover 206. Data definition outputs 314 can include connection parameters 303, current data definition 316 defining a snapshot of source data items 306 at the current time, and the definition and data structures 318 of one or more of temporary target containers 420.

Where the structure of source data items 306 differs from the structure of data items stored in target container 402, temporary target containers 420 may, in embodiments have data structures corresponding to source data items 306 or target container 402.

Temporary target containers 420 can have data structures that vary based on the data structure of source data items 306, such that source data items 306 can be copied into temporary data containers 420. For example, where source data items 306 are database cells, temporary target containers 420 can be one or more database rows. Similarly, where source data items 306 are database rows, temporary target containers 420 can be one or more database tables.

Data mover 206 initiates the copying of source data items 306 to temporary target containers 420. In embodiments, data mover 206 can create temporary target containers 420 as required before the copying is initiated. In embodiments, data mover 206 can perform the copying operation, and in other embodiments data mover 206 can direct the execution of an external data migration tool, such as Teradata Connector for Hadoop, or various other ETL tools. In embodiments data mover 206 can direct an external data migration tool to also create temporary target containers 420.

Data merger 208 replaces data items in target containers 402 matching the data definition 304 with data items in temporary target containers 420. In embodiments, data merger 208 deletes the items in target containers 402 matching current data definition 316, and inserts a copy of the data items matching current data definition 316 in the temporary target data structures 420 into the appropriate location(s) within target container 402 according to mapping details 308. In embodiment, data merger 208 can delete temporary target containers 420 after completion.

Those of ordinary skill in the art will appreciate that the initial copying and merging operations may occur in the background, either through multitasking capabilities of the database system(s) containing source database 300 and target database 400, or by piecewise copying of rows. Those of ordinary skill in the art will appreciate that the initial copy operation and merge may take an extended period of time, for example hours or days, and source data items 306 may have been updated during this time.

Validator 210 analyzes groups of data items in source database 300 and target database 400 to determine if the group is identical in source database 300 and target database 400. Data items in source database 300 and target database 400 are divided into groups based on grouping criteria 312. Groups of data items that are different between the source database 300 and target database 400 can be flagged as "dirty". Data definition inputs corresponding to dirty groups can be provided to instruction generator 204 to initiate replacement of the data items in dirty groups.

In embodiments, grouping criteria 312 can be a particular column or key present in each of the data items. Therefore, each group may contain a set of data items in having the same value in the defined column. In other embodiments, grouping criteria 312 can further include ranges, in which each group contains a set of data items in which the value of the defined column is within particular ranges.

In embodiments, validator 210 can analyze a group of data items by performing an operation over the group of data items in both source database 300 and target database 400, and flagging the group as dirty if the results from each operation do not match. In an example embodiment, validator 210 can perform a sum of the value of the validation parameter 310 in each data item in each group in source database 300 and target database 400. Any group that does not produce the equivalent sum in source database 300 and target database 400 can be marked as a dirty group. In embodiments, other validation operations such as calculation of checksums, hashes or other cryptographic values, or simple determination of the number of data items in each group can be used. In embodiments, validator 210 can generate top-off data definition 404 defining the source data items 306 corresponding to dirty groups as data items to be migrated. Top-off data definition 404 can be which can be provided as input to instruction generator 204. In other embodiments, a list of dirty groups may be provided as input to instruction generator 204, for generation of top-off data definition 404.

In embodiments, validator 210 can analyze one or more groups in temporary target containers 420 or target containers 402, enabling validation of data in temporary contains 420 before merging into target contains 402. In embodiments, validator 210 can be used to compare previously migrated data in order to generate initial data definition 304. In embodiments, validator 210 can report the results of validation to the user interface 202.

In embodiments, the moving, merging, and validation of source data items to target database 400 can be repeated one or more times as needed until no further data requires updates in target database 400.

Figure 3:
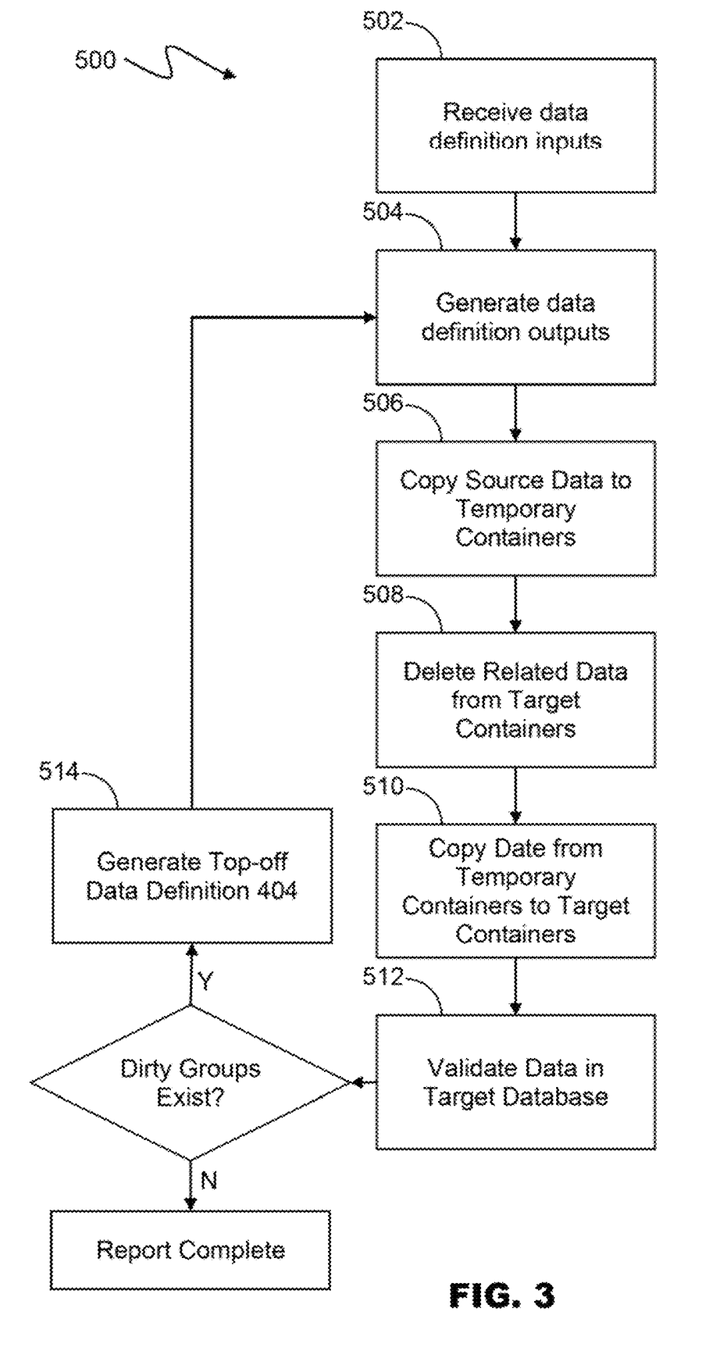
FIG. 3 is a flowchart depicting a method for migration of data, according to an embodiment.

FIG. 3 is a flowchart depicting a method 500 for data migration, according to an embodiment. Method 500 can be executed via the components of data migration system 100 discussed above, which will not be re-defined.

At 502, data definition inputs 302 including initial data definition 304, are received.

At 504, data definition outputs 314, including current data definition 316, are determined.

At 506, copying of source data items 306 from source database 300 to temporary target containers 420 in target database 400 is initiated. This task may include the creation of temporary target containers 420 as required.

At 508, data items in target containers 402 corresponding to data definition inputs 302 are deleted.

At 510, data items in temporary target containers 420 are merged into target containers 402 and, optionally, data items in temporary target containers 420 are deleted.

At 512, data in target database 400 is validated. Groups defined by grouping criteria 312 of data items in target container 402 are compared to corresponding groups in source database 300. Any group 430 that fails the validation check is flagged as a dirty group.

At 514, if dirty groups exist, top-off data definition 404 is generated, defining groups of source data items 306 to be updated. Steps 504 through 514 are repeated for one or more top-off migration operations, substituting top-off data definition 404 for initial data definition 304. In embodiments, only one top-off migration is performed, in embodiments, top-off migrations can be performed until no dirty groups are detected.

In embodiments, initial data migration may have been performed prior to execution of method 500, validation 512 may therefore be performed first, in order to determine the presence of dirty groups and top-off data definition 404.

In operation, data migration system 100 including migration engine 200 can enable a database administrator, or other user (including another computer program or process) to initiate the replication of all or part of a source database 300 to a target database 400, including data items that may have been updated during the replication process.

Figure 4A:
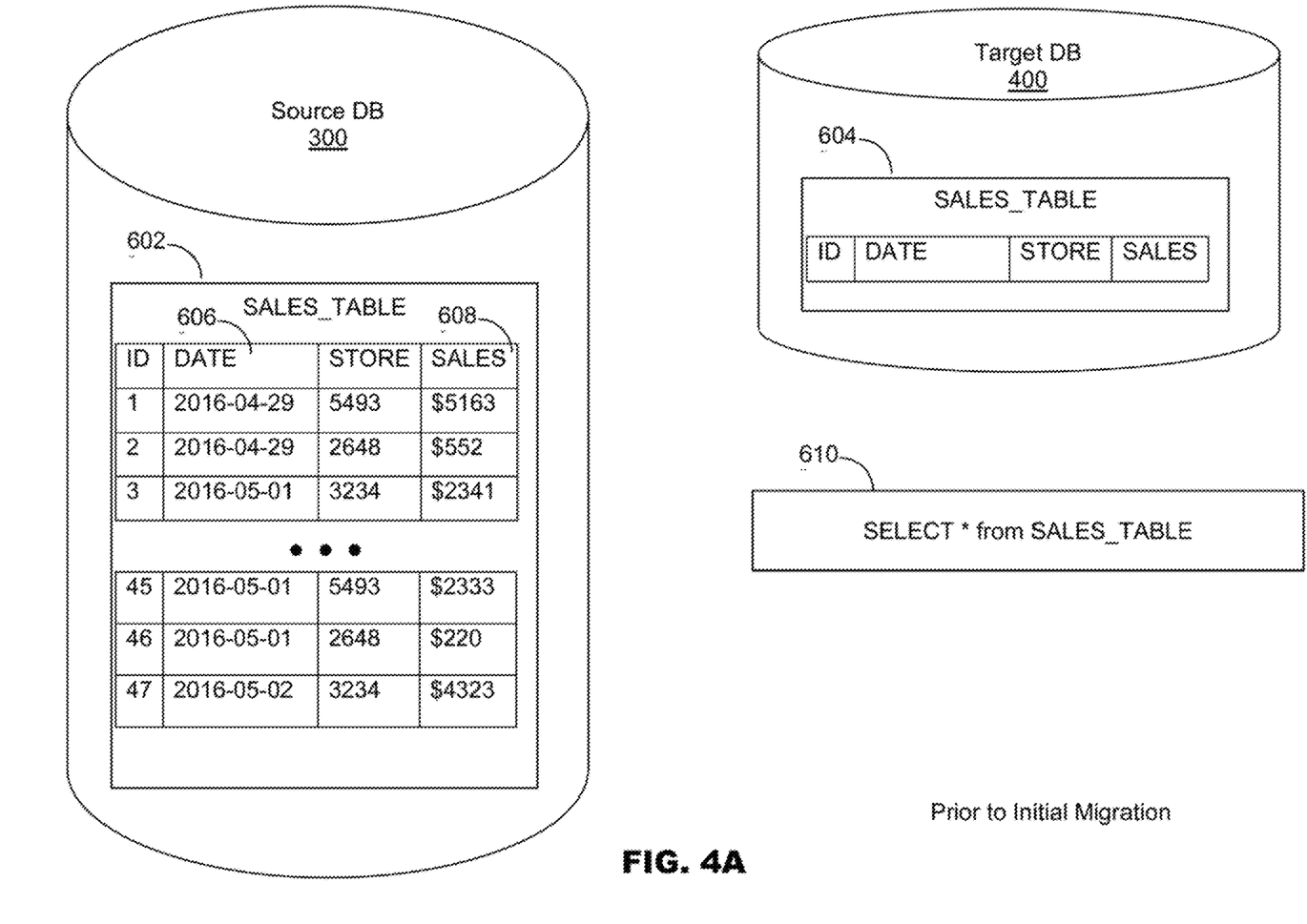
FIG. 4A is a block diagram depicting a the contents of an example source and target database before data migration, according to an embodiment.

FIGS. 4A-4G depict an example application of the disclosed system and method to create a copy of the data in a source table 602 to a target table 604 that includes updates to source table 602 made during the initial migration. As depicted in FIG. 4A, source table 602 in source database 300 is very large and contains multiple terabytes of data, of which only a truncated portion is displayed. Source table 602 has a data structure that includes at least one "group by" field 606 that is expected to be the same or similar across moderately sized groups of rows, and at least one validation field 608 that can be used for validation operations. As depicted, source table 602 is SALES_TABLE, group by field 606 is the DATE field, and validation field 608 is the SALES field. Target table 604 in target database 400 has the same structure as source table 602 and is empty before the migration begins. Here, initial query 610 is an SQL-like query including a SELECT statement defining all of source table 602.

Via user interface 202, initial query 610, validation field 608 and group by field 606 are provided as initial data definition 304, validation parameter 310, and grouping criteria 312, respectively to migration engine 200.

Instruction generator 204 generates data definition outputs 314 including current data definition 316 which corresponds to a snapshot of all rows of source table 602.

Figure 4B:
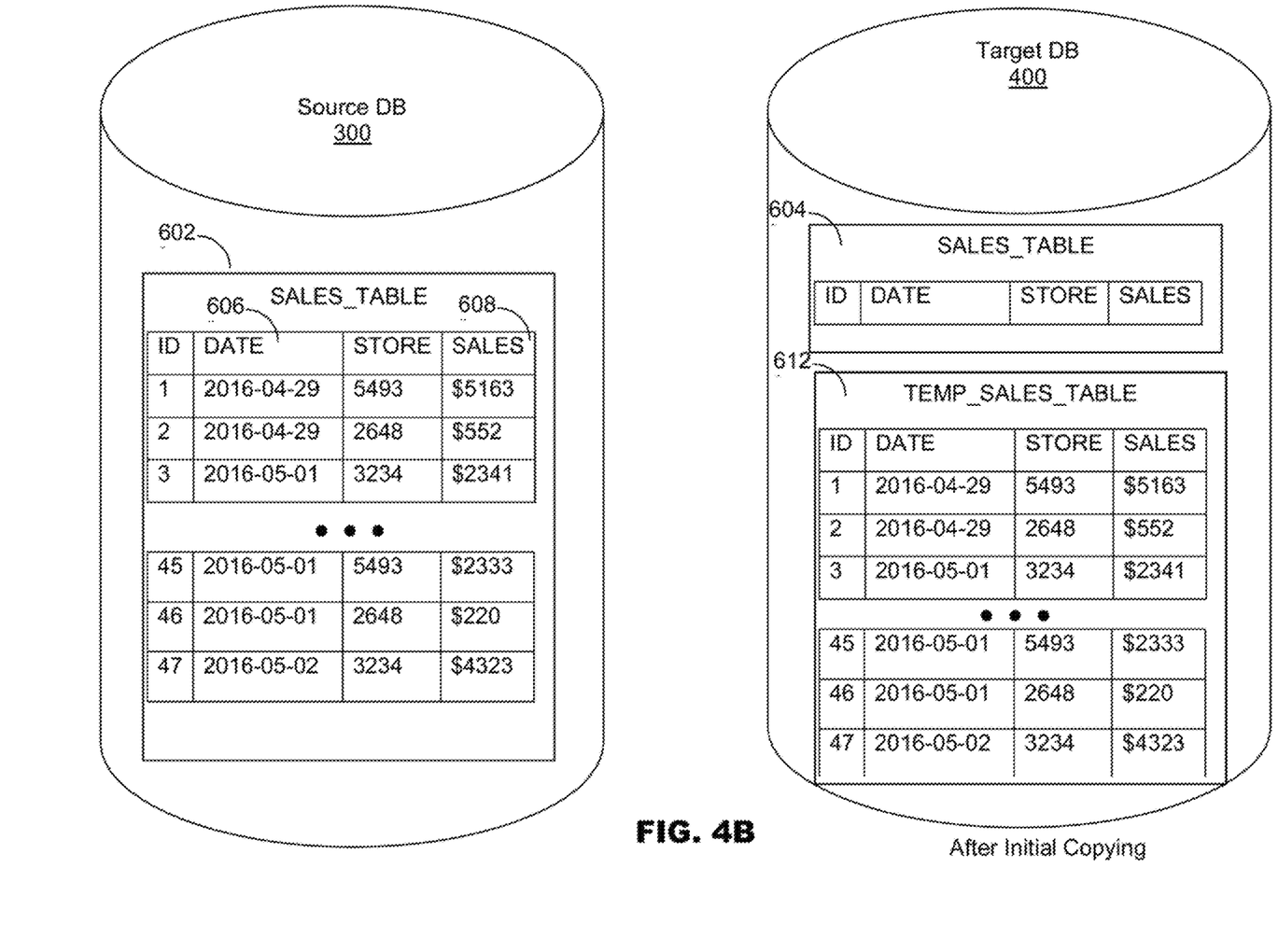
FIG. 4B is a block diagram depicting a the contents of an example source and target database during an initial migration, according to an embodiment.

Data mover 206 initiates the creation of temporary target table 612, with a structure equivalent to source table 602, in target database 400, and the copying of all rows from source table 602 to temporary target table 612. The results of the initial copying are depicted in FIG. 4B.

Figure 4C:
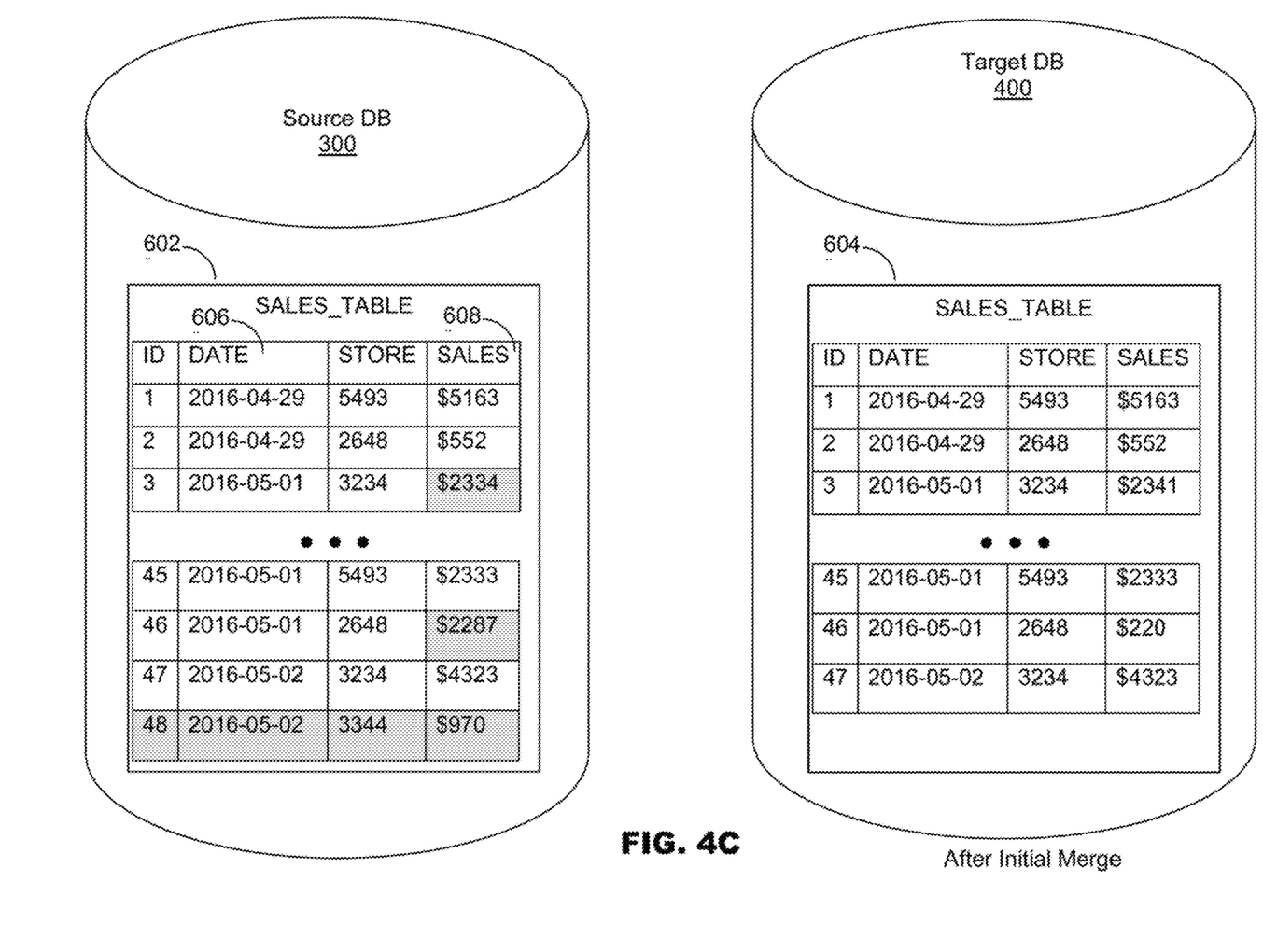
FIG. 4C is a block diagram depicting a the contents of an example source and target database after an initial migration, according to an embodiment.

After the initial copying is complete, data merger 208 queries for rows in target table 604 that correspond to current data definition 316, and finds none. Data merger 208 then copies the data from temporary target table 612 to target table 604 and deletes temporary target table 612, as can be seen in FIG. 4C. In the present example, source database 300 has been updated during the initial migration and cells are in FIG. 4C to indicate the changes.

Figure 4D:
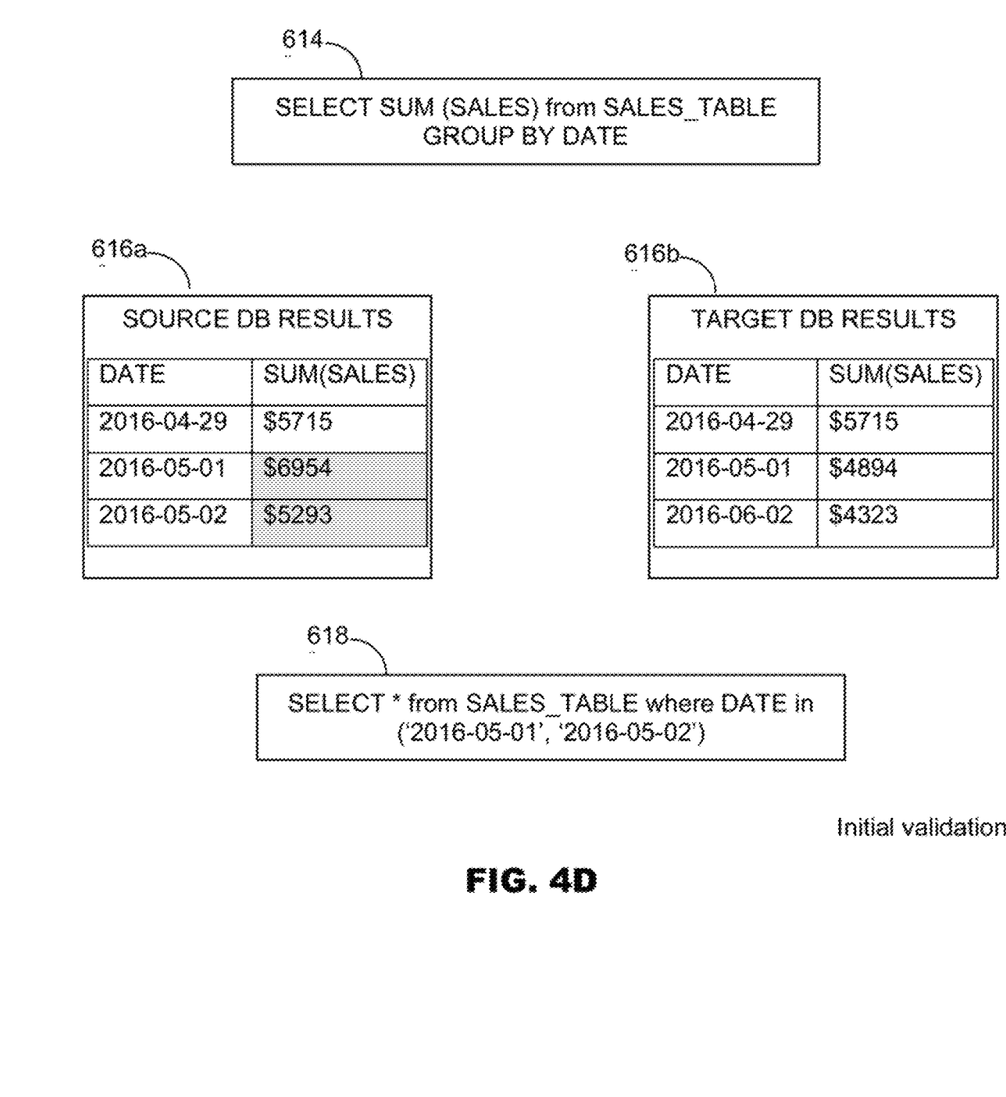
FIG. 4D is a block diagram depicting queries and data structures created and generated during an initial validation, according to an embodiment.

As depicted in FIG. 4D, after the initial migration and merge are complete, validator 210 determines if any groups of data in source table 602 have changed since the initiation of the initial copy operation and need to be updated. Validator 210 performs a query such as validation query 614 in source database 300 and target database 400, and compares the results for each group. Validation query 614 is an SQL-like query that instructs the database to return a sum of the values in the SALES field for each group of rows having the same value in the DATE field. Based on the results 616a and 616b of these queries, validator 210 determines that groups corresponding to May 1, 2016 and May 2, 2016 are dirty and require update.

Validator 210 or instruction generator 204 generates top-off data definition 404, which includes top-off data query 618. Here, top-off data query 618 is an SQL-like query including a SELECT statement requesting all rows where the value in the DATE field is May 1, 2016 or May 2, 2016.

Instruction generator 204 generates data definition outputs 314' (not shown) including current data definition 316' (not shown) which corresponds to a snapshot of all rows of source table 602 where the value in the DATE field is May 1, 2016 or May 2, 2016.

Figure 4E:
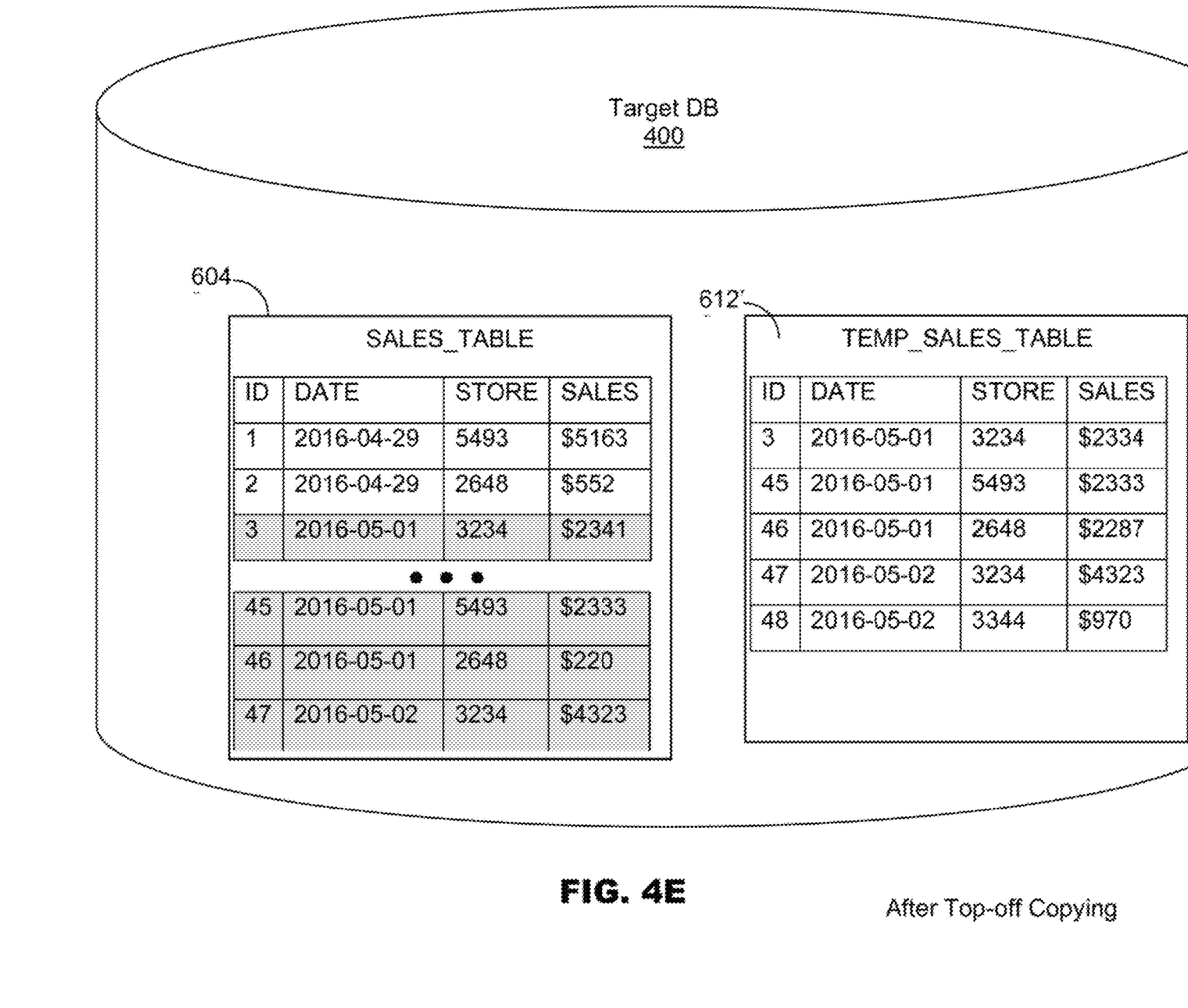
FIG. 4E is a block diagram depicting the contents of an example target database during top-off migration, according to an embodiment.
Figure 4F:
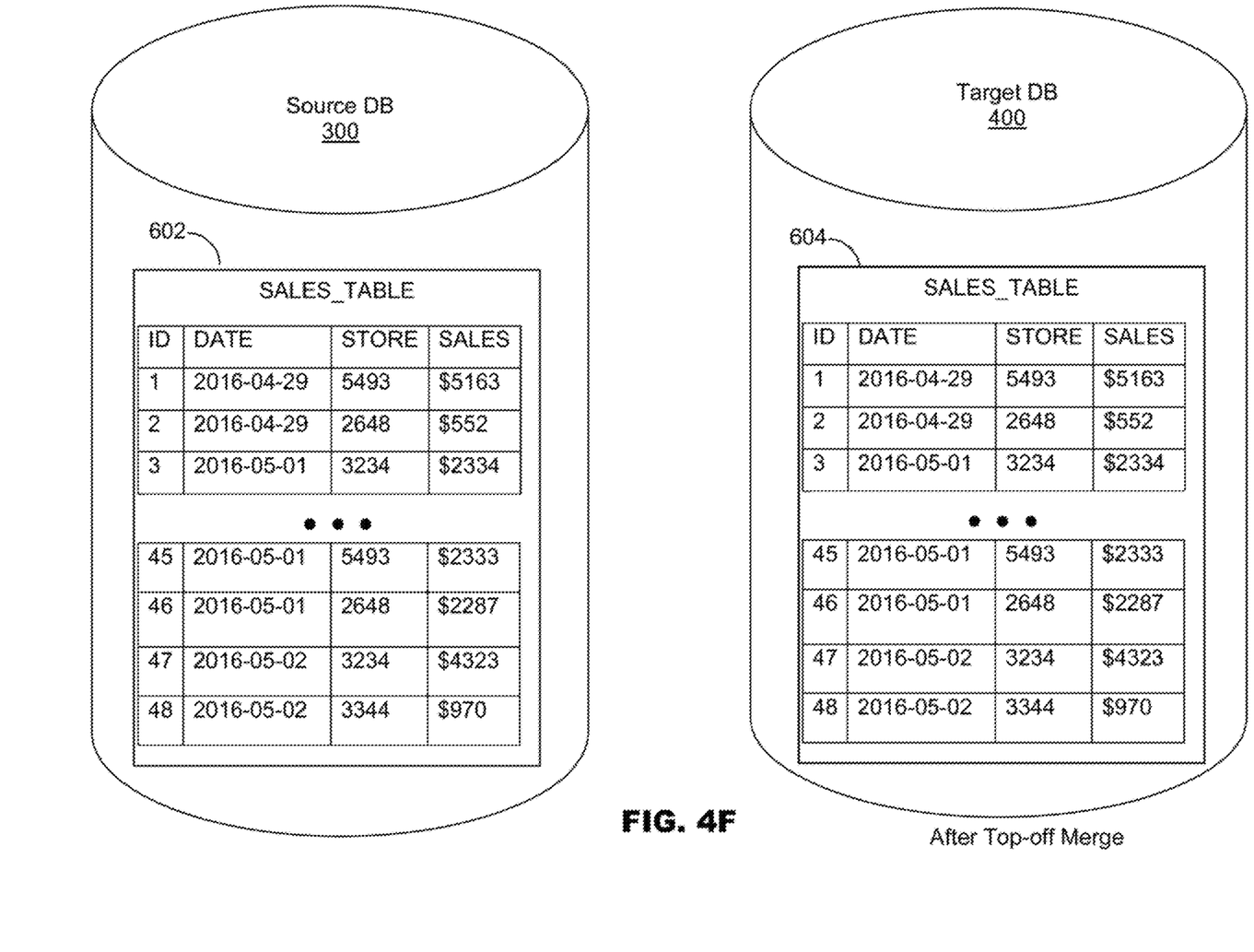
FIG. 4F is a block diagram depicting the contents of an example target database after top-off migration, according to an embodiment.

Data mover 206 initiates the creation of temporary target table 612', with a structure equivalent to source table 602, in target database 400, and the copying of all rows from source table 602 to temporary target table 612'. The result of this operation is depicted in FIG. 4E.

After the top-off copying is complete, data merger 208 queries for rows in target table 604 that correspond to current data definition 316, and may find rows for May 1, 2016 or May 2, 2016. These rows are highlighted in FIG. 4E. Data merger 208 deletes these rows. Data merger 208 then copies the data from temporary target table 612' to target table 604 and deletes temporary target table 612'.

Figure 4G:
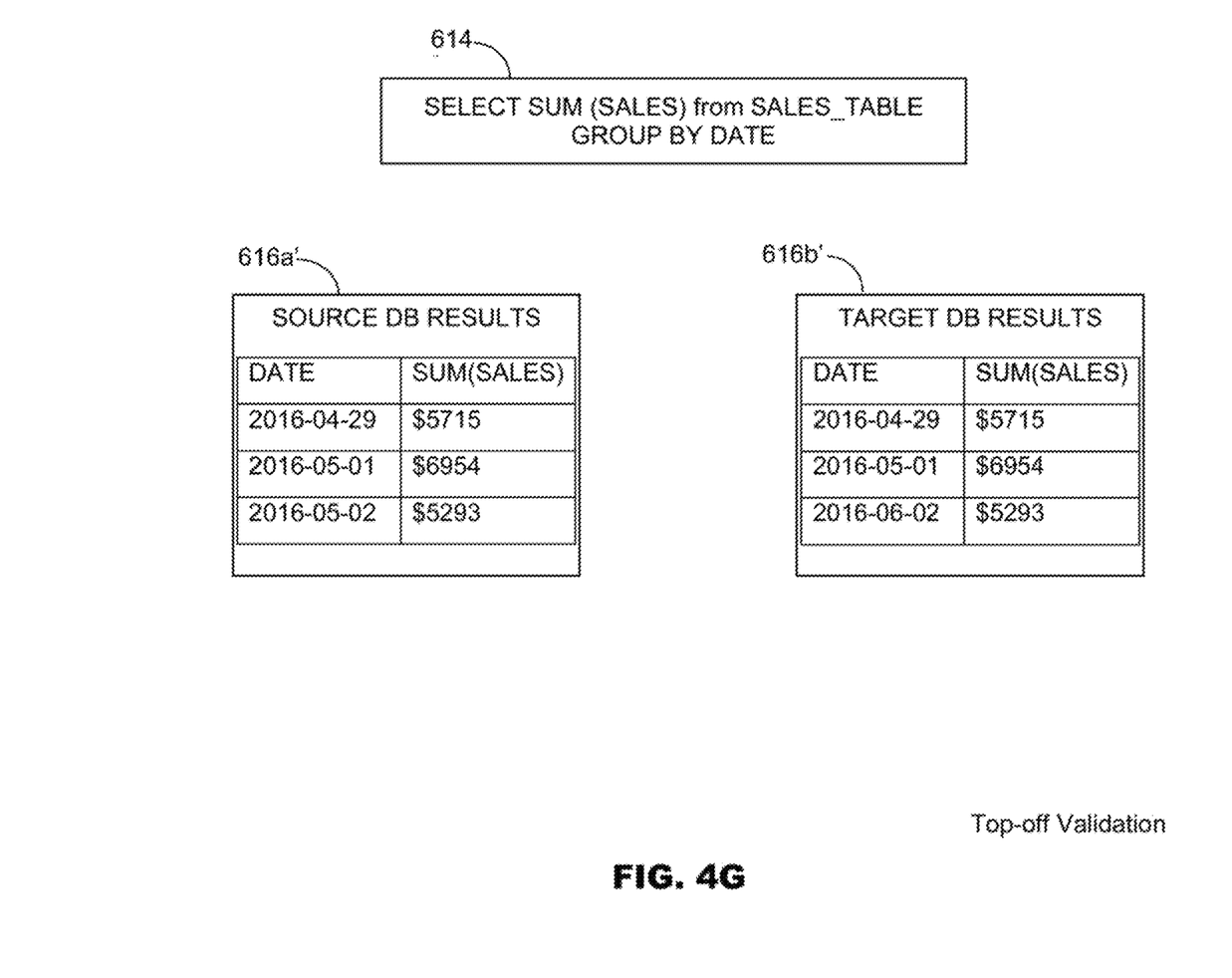
FIG. 4G is a block diagram depicting query and data structures created and generated during top-off validation, according to an embodiment.

Those of ordinary skill in the art will appreciate that the top-off copy and merge operations may complete in a much shorter time, resulting in few or no groups requiring update. As depicted in FIG. 4G, after the top-off copy and merge are complete, validator 210 determines if any groups of data in source table 602 have changed since the initiation of the top-off copy operation and need to be updated. Validator 210 performs a query such as validation query 614 in source database 300 and target database 400, and compares the results for each group. Validation query 614 instructs the database to return a sum of the values in the SALES field for each group of rows having the same value in the DATE field. In the illustrated example, updated results 616a' and 616b' indicate that no groups require update and the migration process is complete, which can be signaled to the user via user interface 202.

Those of ordinary skill in the art will appreciate that it is an advantage to perform a validation operation after an initial migration in order to determine a subset of data items that requires top-off migration. While top-off data definition 404 will likely include data items that have do not require output, the grouping approach of the present disclosure provides efficiency advantages.

Validation of data in groups can be more efficient than approaches that require validation of individual data items. As illustrated in the example embodiment of FIGS. 4A-4G, validation can utilize the database system group and data analysis functionalities. In addition, because dirty groups of data items are identified, top-off data definition 404 can be simpler than a data definition requiring a list of each data item to be updated. Those of ordinary skill in the art will appreciate that more advantages of the systems and methods of the current disclosure may exist.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A method for migrating a set of time-varying data from a source database to a target database, the method comprising:
receiving one or more data definition inputs, the data definition inputs defining the set of time-varying data to be migrated and a data structure of a target container of the target database;
at an initial time, determining an initial snapshot of the defined set of time-varying data in the source database from the one or more data definition inputs and the source database;
generating one or more data definition outputs from the one or more data definition inputs and the initial snapshot;
initiating the copying of the initial snapshot to the target database based on at least the data structure of the target container;
at one or more subsequent times after the initial time, identifying, using at least one group by a validation operation on the corresponding at least one group in the source database and the validation operation on the corresponding at least one group in the target database, one or more subsequent sets of time-varying data in the source database that have been updated in the source database between the initial time and the subsequent time from the data definition outputs and the time-varying data in the source database;
determining one or more subsequent snapshots from the one or more subsequent sets of time-varying data in the source database; and
initiating the copying of the one or more subsequent snapshots to the target database.

2. The method of claim 1, further comprising:
at a validation time, determining a result based on whether a portion of the data in the target database is equivalent to a corresponding portion of the time-varying data in the source database;
providing an output of the result.

3. The method of claim 1, wherein initiating the copying of the initial snapshot comprises:
instructing a data mover to perform an operation to copy the initial snapshot to the target database; and
receiving a notification that the operation is complete from the data mover.

4. The method of claim 3, wherein at least one of the subsequent times occurs after the receipt of the notification that the operation is complete.

5. The method of claim 1, wherein initiating the copying of the initial snapshot comprises:
creating one or more temporary data structures in the target database based on the one or more data definition outputs;
initiating the copying of the initial snapshot into the one or more temporary data structures in the target database; and
merging the one or more temporary data structures in the target database with existing data structures in the target database.

6. The method of claim 5, wherein initiating the copying of the subsequent snapshots comprises:

creating one or more temporary data structures in the target database based on the one or more data definition outputs;

initiating the copying of the initial snapshot into the temporary data structures in the target database; and merging the temporary data structures in the target database with the existing data structures in the target database.

7. The method of claim 6, wherein the data definition inputs further define the at least one group as at least one grouping criteria defining one or more groups of data items in the source database and the target database and at least one validation field; and wherein identifying the one or more sets of subsequent data comprises:

executing a validation operation across each group of data in the source databases and the target database defined by the grouping criteria to determine a source database result and a target database result for each group of data; and adding a group of data items in the source database to the one or more sets of subsequent data if the source database result does not match the target database result.

8. A system for migrating time-varying data from a source database to a target database, the system comprising:

a computer system communicatively coupled to the source database and the target database;

a computer program, executable on the computer system, the program adapted to receive one or more data definition inputs and perform the following:

receive one or more data definition inputs, the data definition inputs defining the set of time-varying data to be migrated and a data structure of a target container of the target database;

at an initial time, determine an initial snapshot of the defined set of time-varying data in the source database from the one or more data definition inputs and the source database;

generate one or more data definition outputs from the one or more data definition inputs and the initial snapshot;

initiate the copying of the initial snapshot to the target database based on at least the data structure of the target container;

at one or more subsequent times after the initial time, identify, using at least one group by a validation operation on the corresponding at least one group in the source database and the validation operation on the corresponding at least one group in the target database, one or more subsequent sets of time-varying data in the source database that have been updated in the source database between the initial time and the subsequent time from the data definition outputs and the time-varying data in the source database;

determine one or more subsequent snapshots from the one or more subsequent sets of time-varying data in the source database; and initiate the copying, of the one or more subsequent snapshots to the target database.

9. The system of claim 8, further comprising an output interface, and wherein the program is further adapted to:

at a validation time, determine a result based on whether a portion of the data in the target database is equivalent to the corresponding portion of the time-varying data in the source database; and provide an output of the result to the output interface.

10. The system of claim 8, further comprising a data mover communicatively coupled to the computer system, the source database, and the target database, and wherein the program initiates the copying of the initial snapshot by:

instructing the data mover to perform an operation to copy the initial snapshot to the target database; and receiving a notification that the operation is complete from the data mover.

11. The system of claim 10, wherein at least one of the subsequent times occurs after the receipt of the notification that the operation is complete.

12. The system of claim 8, wherein the program initiates the copying of the initial snapshot by:

creating one or more temporary data structures in the target database based on the one or more data definition outputs;

initiating the copying of the initial snapshot into the temporary data structures in the target database; and merging the temporary data structures in the target database with the existing data structures in the target database.

13. The system of claim 12, wherein initiating the copying of the subsequent snapshots comprises:

creating one or more temporary data structures in the target database based on the one or more data definition outputs;

initiating the copying of the initial snapshot into the temporary data structures in the target database; and merging the temporary data structures in the target database with the existing data structures in the target database.

14. The system of claim 13, wherein the data definition inputs further define the at least one group as at least one grouping criteria defining one or more groups of data items in the source database and the target database and at least one validation field; and wherein the program identifies the one or more sets of subsequent data by:

executing a validation operation across each group of data in the source databases and the target database defined by the grouping criteria to determine a source database result and a target database result for each group of data; and adding a group of data items in the source database to the one or more sets of subsequent data if the source database result does not match the target database result.

* * * * *